UNITED STATES PATENT OFFICE.

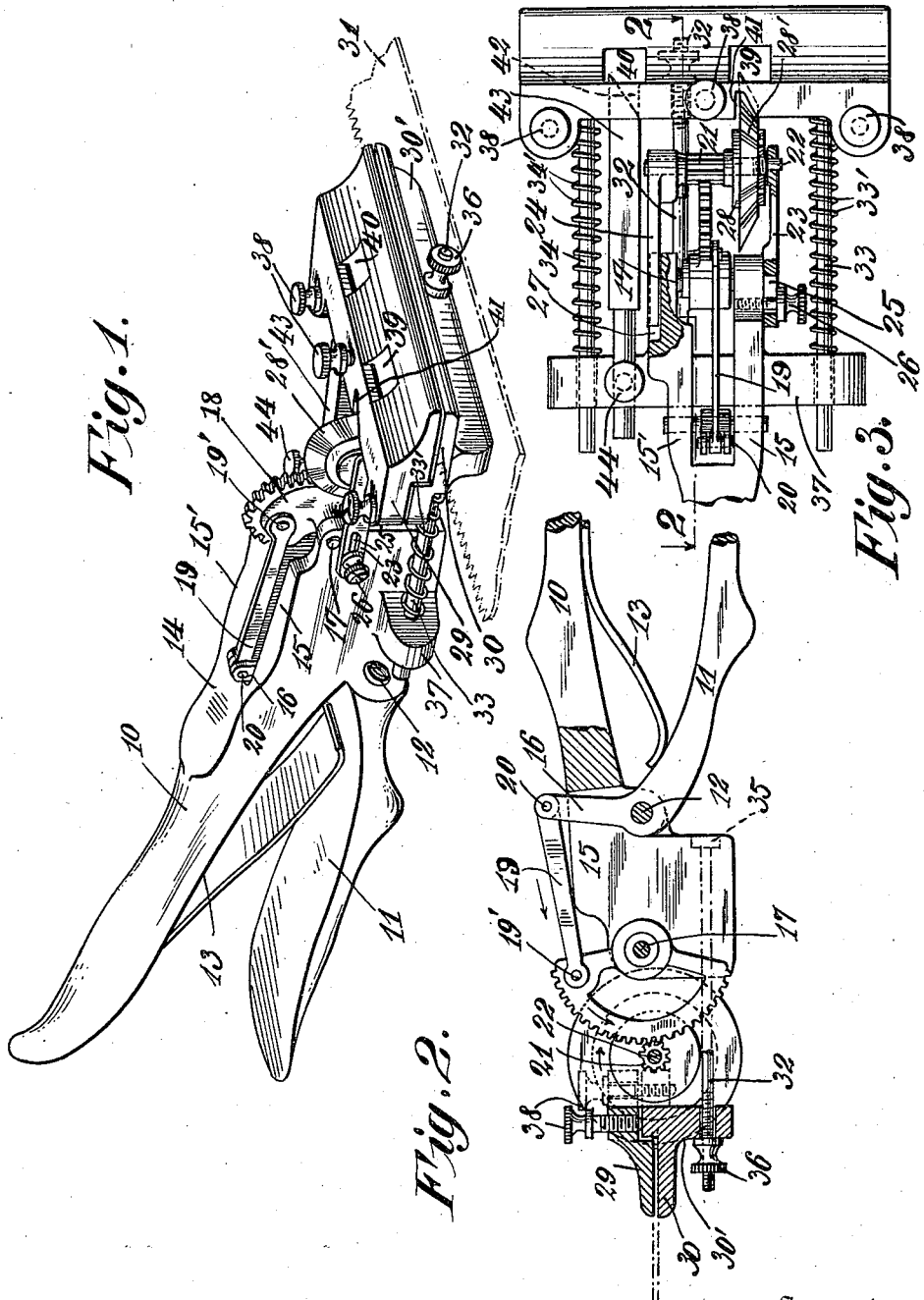

STEVEN HARDY, OF NEW YORK, N. Y.

SAW-SHARPENING IMPLEMENT.

1,262,945.

Specification of Letters Patent.   Patented Apr. 16, 1918.

Application filed May 2, 1917. Serial No. 166,039.

*To all whom it may concern:*

Be it known that I, STEVEN HARDY, a subject of the King of Hungary, residing at New York, in the county of New York and State of New York, have invented new and useful Improvements in Saw-Sharpening Implements, of which the following is a specification.

This invention relates to implement sharpeners, the invention being more particularly related to new and useful improvements in implements for sharpening the teeth of saw-blades.

A primary object of the invention is the provision of a hand actuated device for sharpening saw teeth, which is adapted to be operated in a rapid and efficient manner without any special experience on the part of the operator.

Another object is the provision of a device of this character, which is so formed and so adjustable that it will operate effectually upon saws differing in size and having differently spaced teeth.

A further object is the provision of a device which is compact in form, occupying but little space, which is simple in construction and comparatively inexpensive to manufacture.

With these objects and others in view, which will be more fully comprehended as the description proceeds, the invention consists in the novel construction, combination and arrangement of parts hereinafter described and illustrated in the accompanying drawings, forming a part of this specification, and in which:—

Figure 1 is a perspective view of the device made in accordance with my invention.

Fig. 2 is a vertical longitudinal sectional view taken approximately in the direction indicated by line 2—2 of Fig. 3.

Fig. 3 is a top plan view, illustrating the working parts, the handle elements being broken away.

Referring more particularly to the accompanying drawings, the numerals 10 and 11 indicate coöperating handle elements, which are pivoted at 12 so as to enable them to have opening and closing movements, the said elements being normally held apart by means of a flat push spring 13, attached at one end preferably to the upper handle element 10, the lower end thereof being in slidable engagement with the lower handle 11 near the pivoted connection 12.

The upper handle 10 merges into a head portion 14 which is vertically bifurcated to form parallel parts 15 and 15' having a space therebetween for the disposition and operation of the working parts.

As best shown in Fig. 2, the lower handle element 11 merges into an arm 16 which projects upwardly approximately at right-angles thereto through the bifurcated head.

Rotatably journaled in and between the parallel elements 15 and 15' is a shaft 17 having fixed thereon a gear sector 18. In order to impart reciprocating motion to the gear sector, when the handles are actuated, a connecting rod 19 pivotally connects the same at 19' with the upper end of the arm 16 at 20.

Meshing with gear sector 18 is a pinion 21 which is rotatable on a shaft 22, the latter being secured in suitable projecting bracket arms 23 and 24. The arm 23 is preferably formed with a slot 25 at its rear end so as to be securably adjustable upon thumb screw 26, threaded into the parallel member 15, while the corresponding end of arm 24 is slidably maintained in a longitudinal channel 27 provided for the purpose in the parallel member 15'.

Formed with the pinion 21 is a disk 28 detachably carrying an emery or other suitable grinding wheel 28' having a beveled periphery. Thus I provide for the support and operation of a grinding or sharpening element, the same being arranged for reciprocal rotation by means of the opening and closing movements of the handles 10 and 11, it being obvious that the extent of the reciprocal turns or of the rotation of the grinding element will depend upon the respective sizes of the several levers, and of the meshing gears as well.

To provide means for holding the device rigid with a saw-blade so that the grinding wheel 28' may operate efficiently upon the teeth thereof, I employ a pair of longitudinal vise-like mating-sections 29 and 30, which are formed intermediate their width with longitudinal vertical shoulders, the shoulder on the lower section 30 serving as a wall against which the teeth of a saw-blade as 31 abuts, when interposed between the sections. These sections are supported from the head formed on the upper handle 10 by means of the spaced-apart parallel rods 32, 33, and 34. The rod 32, representing the central one, is threaded at its outer end into a longitudinal strip 30', formed on the underside of the section 30, the remote end of the same being threaded into a nut 35, rigidly held in a cavity provided for the purpose in the member 15'. A thumb screw 36, threaded upon the outer end of this rod, serves to adjust the mating section 30 relatively with respect to the handle elements. The other rods, 33 and 34, have their outer ends rigidly secured in the projection 30', their inner ends being slidable in suitable holes provided transversely in the opposed ends of a cross-piece 37, which is secured to the underneath ends of the members 15 and 15'. Coil push springs 33' and 34' mounted respectively, around these rods, tend to maintain the section 30 uniformly against lateral swinging upon the rod 32.

The upper section 29 is adjustably maintained in position upon the mating-section 30 by means of thumb screws as 38. This section, as best illustrated in Figs. 1 and 3, is preferably provided in its forward face with a pair of spaced openings 39 and 40, the opening 39 being in communication with a vertical triangular opening 41, which is designed for the reception of the beveled edge of the grinding wheel 28', the said opening 41 extending correspondingly through both of the sections 29 and 30.

Communicating with the opening 40 is an underneath transverse opening 42 similarly cut in both of the sections, and in which is seated the front beveled end of a tooth engaging-clamp 43, the rear end of which is slidable in a suitable transverse opening provided in the cross-piece 37. A thumb screw 44, threaded in cross-piece 37, serves to secure the engaging-clamp 43 in the position required. Thus it will be seen that the coöperating sections 29 and 30 are adjustably supported relatively with respect to the grinding wheel 28' so that by means of the manipulation of thumb screw 32, they may be extended or retracted for the engagement of the beveled edge of the grinding wheel 28' with the teeth of a saw as 31.

From the foregoing description, taken in connection with the accompanying drawings, it is believed that the operation of my device will be obvious. A saw as 31 may be held in any suitable vise, or if no vise is available, it may be held in the hands of the operator. In either case, the toothed end of the saw is entered between the sections, which are clamped tightly upon either side of the saw-blade by means of the thumb screws as 38, the device being locked against movement longitudinally of the saw-blade by means of the entrance between two saw teeth of the engaging-clamp 43. When clamped upon the saw-blade in this manner, the thumb screw 32 is manipulated so that the grinding wheel 28' engages the tooth to be sharpened. The teeth of the saw-blade may thus be sharpened one after another upon the proper shifting of the device.

Having thus described my invention, what I claim is:—

1. An implement for sharpening saws comprising a pair of pivotally connected handles, one of which merges into spaced head members, the other merging into an angular arm extending between said head members, a gear wheel mounted for rotation between said head members, a rod pivotally connecting said arm with said gear wheel, a pinion rotatably supported between the head members in advance of the gear and meshing therewith, a disk wheel combined with the pinion, a grinding element detachably carried by the disk wheel, a pair of coöperating sections adapted to grip a saw-blade adjustably supported from the head members in advance of said grinding element.

2. An implement for sharpening saws comprising a pair of pivotally connected handles, one of said handles merging into a vertically channeled head, and the other terminating in an angular arm extending through said channeled head, a gear wheel mounted for rotation in said channeled head, a rod pivotally connecting said arm with said gear wheel, a pinion rotatably supported by said channeled head in advance of said gear and meshing therewith, a disk wheel combined with the pinion, a grinding element detachably carried by the disk wheel, a pair of coöperating horizontal saw sections adjustably supported from said head in advance of said grinding element and means for adjusting said horizontal saw sections vertically with respect to each other.

3. An implement for sharpening saws comprising a pair of handles pivotally connected at one end, the upper handle merging into an extended vertically channeled head, the lower handle terminating in an angular arm upwardly projecting through said channeled head, means combined with said handles to hold the same normally apart, a gear wheel rotatable in the channeled head, a rod pivotally connecting said gear wheel with said upwardly projecting arm, a pinion rotatably supported by said channeled head in advance of said gear and meshing therewith, a disk wheel combined with said pinion and rotatable therewith, a grinding element detachably carried by said disk wheel, a pair of coöperating horizontal jaw sections adapted to grasp the blade of a saw adjustably supported from said head in advance of said grinding element, and means adjustably secured in the head element and coöperating with said jaw sections for clamping and maintaining the saw blade against longitudinal movement.

In testimony whereof I have signed my name to this specification.

STEVE HARDY.